United States Patent
Yamamoto et al.

(10) Patent No.: US 10,031,610 B2
(45) Date of Patent: Jul. 24, 2018

(54) OPERATION DEVICE FOR VEHICLE

(71) Applicants: Takuo Yamamoto, Toyota (JP);
Hideharu Kanbayashi, Miyoshi (JP);
Naoki Kamiya, Toyota (JP); Shoichi Komoto, Toyota (JP)

(72) Inventors: Takuo Yamamoto, Toyota (JP);
Hideharu Kanbayashi, Miyoshi (JP);
Naoki Kamiya, Toyota (JP); Shoichi Komoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 39 days.

(21) Appl. No.: 14/767,856

(22) PCT Filed: Feb. 19, 2013

(86) PCT No.: PCT/JP2013/054044
§ 371 (c)(1),
(2) Date: Aug. 13, 2015

(87) PCT Pub. No.: WO2014/128838
PCT Pub. Date: Aug. 28, 2014

(65) Prior Publication Data
US 2016/0011712 A1  Jan. 14, 2016

(51) Int. Cl.
*G06F 3/041* (2006.01)
*G01C 21/36* (2006.01)
(Continued)

(52) U.S. Cl.
CPC .......... *G06F 3/0416* (2013.01); *B60K 35/00* (2013.01); *G01C 21/36* (2013.01); *G06F 3/041* (2013.01);
(Continued)

(58) Field of Classification Search
CPC ...... G06F 3/0416; G06F 3/041; G06F 3/0482; G06F 3/04842; B60K 35/00; G01C 21/36
See application file for complete search history.

(56) References Cited

U.S. PATENT DOCUMENTS 8,149,224 B1 * 4/2012 Kuo ...................... G06F 1/1626
                                                              345/156
2005/0024341 A1  2/2005 Gillespie et al.
(Continued)

FOREIGN PATENT DOCUMENTS

EP  2077490 A2 * 12/2008 ............. G06F 3/048
EP  2077490 A2   12/2008
(Continued)

OTHER PUBLICATIONS

International Search Report for PCT/JP2013/054044 dated Apr. 9, 2013 [PCT/ISA/210].
(Continued)

*Primary Examiner* — Towfiq Elahi
(74) *Attorney, Agent, or Firm* — Sughrue Mion, PLLC (57) ABSTRACT

An operation device for a vehicle, includes a touch operational surface configured to be movable upward and downward, and to include a sensor to output a signal representing a contact of a finger; an outer frame member configured to be disposed around a circumference of the touch operational surface, in an aspect such that the outer frame member projects upward compared to the touch operational surface, or in an aspect such that the outer frame member extends on the same plane as the touch operational surface, and to be movable upward and downward together with the touch operational surface as a whole; a down movement detection unit configured to output a signal representing a down movement of the outer frame member; and a control unit configured to respond, based on the signal output by the sensor, to a selection operation performed on selection items
(Continued)

shown on a display unit being remotely placed with respect to the touch operational surface, and to respond, based on the signal output by the down movement detection unit, to a determination operation performed on the selection item having been selected.

8 Claims, 10 Drawing Sheets

(51) Int. Cl.
*G06F 3/0482* (2013.01)
*B60K 35/00* (2006.01)
*G06F 3/0484* (2013.01)

(52) U.S. Cl.
CPC ........ *G06F 3/0482* (2013.01); *G06F 3/04842* (2013.01); *B60K 2350/1004* (2013.01); *B60K 2350/1032* (2013.01); *B60K 2350/941* (2013.01); *G01C 21/3664* (2013.01)

(56) References Cited

U.S. PATENT DOCUMENTS

| | | | |
|---|---|---|---|
| 2006/0164387 A1 | 7/2006 | Takisima | |
| 2010/0026640 A1* | 2/2010 | Kim | G06F 3/0414 345/173 |
| 2010/0295803 A1* | 11/2010 | Kim | G06F 3/0488 345/173 |
| 2012/0113001 A1 | 5/2012 | Yamauchi et al. | |
| 2012/0260164 A1 | 10/2012 | Scheufler et al. | |
| 2013/0003270 A1* | 1/2013 | Kim | G06F 1/1626 361/679.01 |

FOREIGN PATENT DOCUMENTS

| | | |
|---|---|---|
| EP | 2077490 A2 | 7/2009 |
| JP | 02-112013 A | 4/1990 |
| JP | 10-198507 A | 7/1998 |
| JP | 1126135 A | 5/1999 |
| JP | 11126135 A | 5/1999 |
| JP | 2000-111354 A | 4/2000 |
| JP | 2000-311052 A | 11/2000 |
| JP | 2005-216110 A | 8/2005 |
| JP | 2006209279 A1 | 8/2006 |
| JP | 2008-234212 A | 10/2008 |
| JP | 2011-081669 A | 4/2011 |
| JP | 2012247890 A | 12/2012 |
| JP | 2013-022986 A | 2/2013 |
| JP | 201333309 A | 2/2013 |
| WO | 2010146656 A1 | 12/2010 |
| WO | 2011/145330 A1 | 11/2011 |

OTHER PUBLICATIONS

Written Opinion for PCT/JP2013/054044 dated Apr. 9, 2013 [PCT/ISA/237].

* cited by examiner

OPERATION DEVICE FOR VEHICLE

CROSS REFERENCE TO RELATED APPLICATIONS

This application is a National Stage of International Application No. PCT/JP2013/054044 filed Feb. 19, 2013, the contents of all of which are incorporated herein by reference in their entirety.

TECHNICAL FIELD

The disclosures herein generally relate to an operation device for a vehicle.

BACKGROUND ART

Conventionally, as a pointing device for a POS device with which an arrow is moved on a screen of a computer, a pointing device has been known that includes a touch pad surface that can be moved upward and downward, and a switch under the touch pad surface that is turned on when a force having a predetermined pressure or greater is applied to the touch pad surface (see, for example, Patent Document 1).

RELATED-ART DOCUMENTS

Patent Documents

[Patent Document 1] Japanese Laid-open Patent Publication No. 10-198507

SUMMARY OF THE INVENTION

Problem to be Solved by Invention

However, when using an operation device including a touch operational surface in a vehicle, there are cases where the operator detaches the finger from the touch operational surface during an operation. For example, a case may be considered where the driver is the operator, and he/she operates the touch operational surface while stopping the vehicle when a traffic light is red, and then, the traffic light turns green, and he/she has the vehicle restart traveling. In such a case, to continue the operation after the restart, he/she can have the finger contact the touch operational surface. However, it is highly likely that a touch position at this moment is shifted from a position on the touch operational surface that corresponds to an operational item that has already been selected. Therefore, it is useful that a determination operation of an operational item can be performed without operating the touch operational surface on the operation device for the vehicle. In this regard, although it is possible to provide a determination switch (a mechanical switch) that is separated from the touch operational surface, providing such a determination switch makes the operation device larger as a whole, and is not preferable from the space-saving point of view.

Thereupon, it is an object of at least one embodiment of the present invention, to provide an operation device for a vehicle with which a determination operation of an operational item can be performed without operating the touch operational surface, while achieving the space-saving.

Means to Solve the Problem

According to at least one embodiment of the present invention, an operation device for a vehicle, includes a touch operational surface configured to be movable upward and downward, and to include a sensor to output a signal representing a contact of a finger; an outer frame member configured to be disposed around a circumference of the touch operational surface, in an aspect such that the outer frame member projects upward compared to the touch operational surface, or in an aspect such that the outer frame member extends on the same plane as the touch operational surface, and to be movable upward and downward together with the touch operational surface as a whole; a down movement detection unit configured to output a signal representing a down movement of the outer frame member; and a control unit configured to respond, based on the signal output by the sensor, to a selection operation performed on selection items shown on a display unit being remotely placed with respect to the touch operational surface, and to respond, based on the signal output by the down movement detection unit, to a determination operation performed on the selection item having been selected.

Advantage of the Invention

According to at least one embodiment of the present invention, it is possible to provide an operation device for a vehicle with which a determination operation of an operational item can be performed without operating a touch operational surface, while achieving the space-saving.

MODE FOR CARRYING OUT THE INVENTION

In the following, embodiments of the present invention will be described in detail with reference to the drawings.

Figure 1:
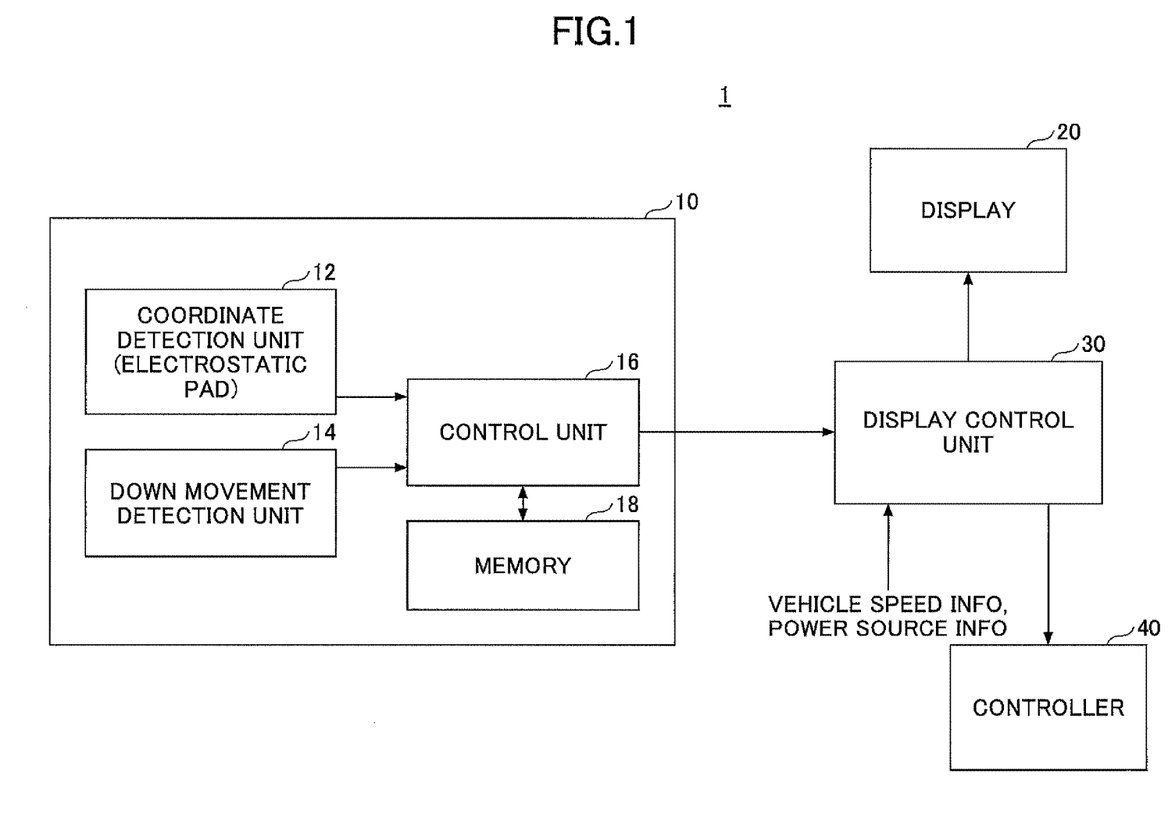
FIG. 1 is a system diagram that illustrates a basic configuration of an operation device for a vehicle 1 according to an embodiment of the present invention.
Figure 2:
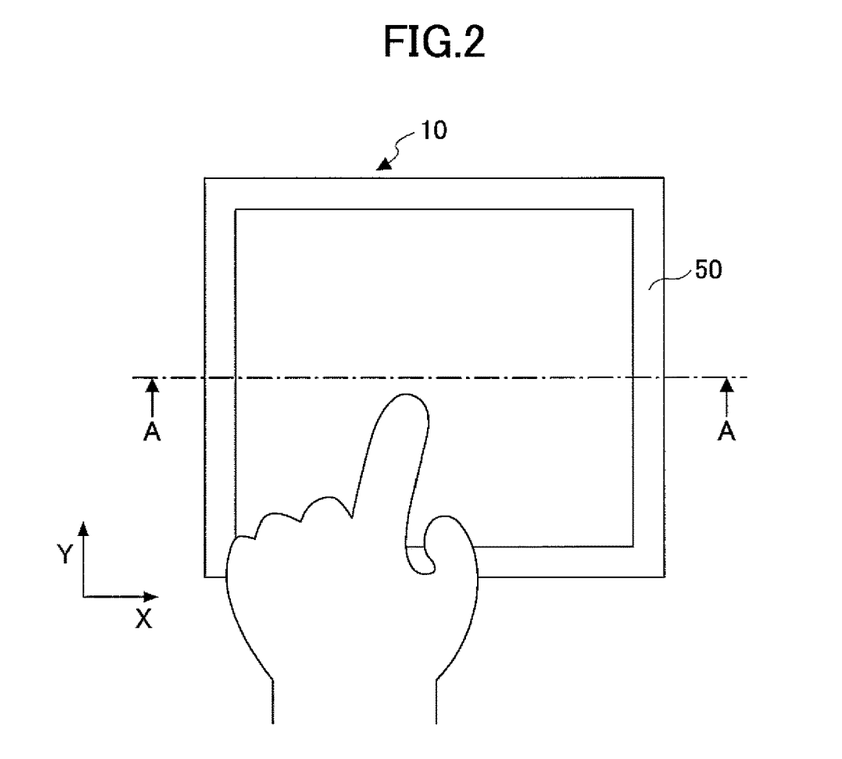
FIG. 2 is a top view that basically illustrates a touch pad 10.
Figure 3:
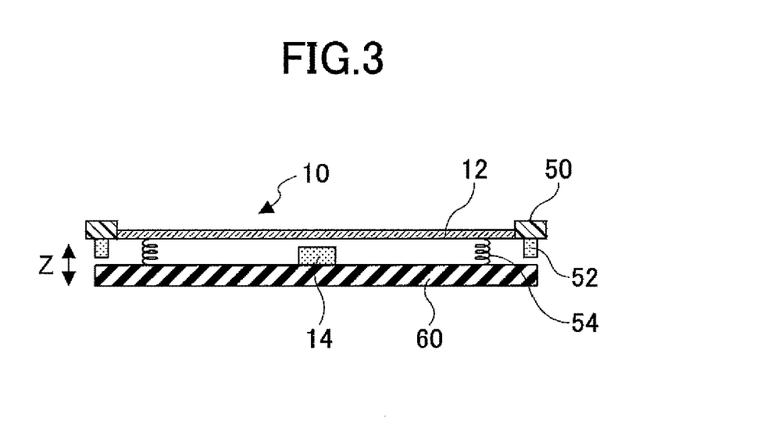
FIG. 3 is a cross-sectional view that basically illustrates a cross section of a core part of the touch pad 10.
Figure 4:
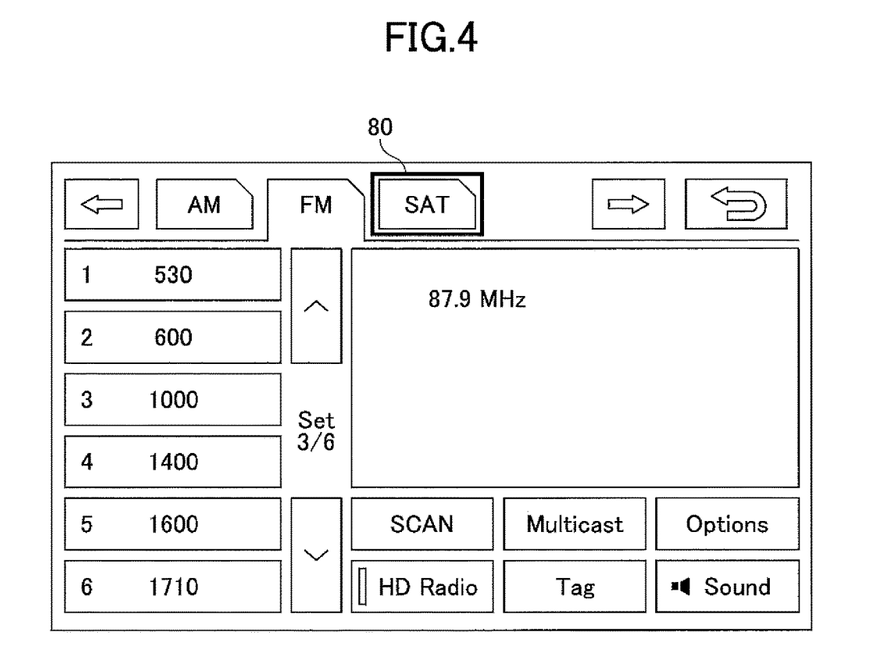
FIG. 4 is a diagram that illustrates an example of an operational screen shown on a display 20.
Figure 5:
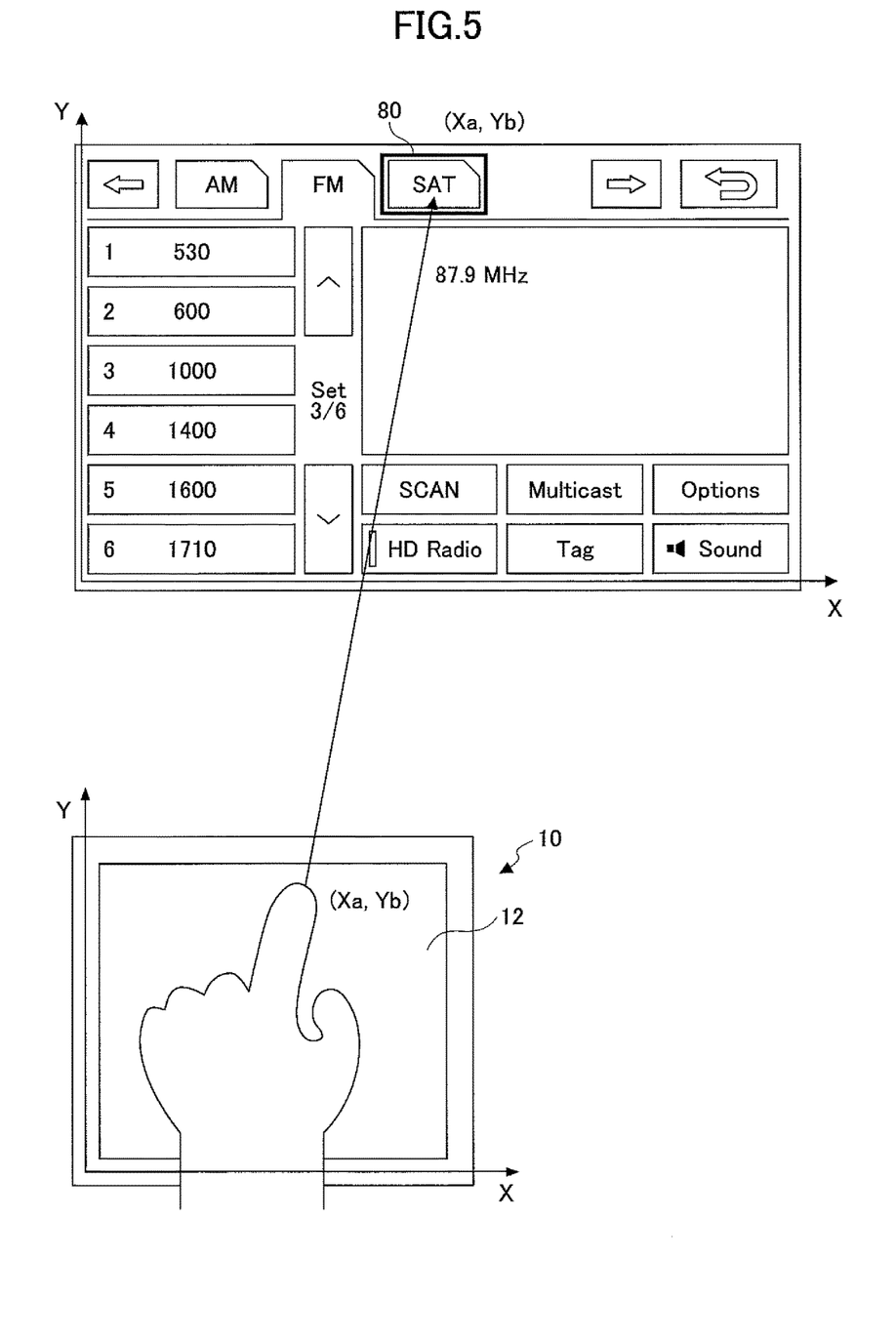
FIG. 5 is a diagram that basically illustrates the display 20 and the touch pad 10, and is a diagram that conceptually illustrates an example of operations in an absolute coordinate mode.

FIG. 1 is a system diagram that illustrates a basic configuration of an operation device for a vehicle 1 according to an embodiment of the present invention. FIG. 2 is a top view that basically illustrates a touch pad 10. FIG. 3 is a cross-sectional view that basically illustrates a cross section of a core part of the touch pad 10. Note that a hand is illustrated in FIG. 2 that operates a coordinate detection unit 12 (a touch operational surface) of the touch pad 10, but not illustrated in FIG. 3. FIG. 4 is a diagram that illustrates an example of an operational screen shown on a display 20. FIG. 5 is a diagram that basically illustrates the display 20 and the touch pad 10, and is a diagram that conceptually illustrates an example of operations in an absolute coordinate mode.

The operation device for the vehicle 1 includes the touch pad 10, the display 20, and a display control unit 30.

The touch pad 10 is disposed at an appropriate place in the vehicle compartment. The touch pad 10 is preferably placed at a position that is easy for the driver to operate (a position reachable by a hand while keeping a driving posture). The touch pad 10 is typically placed at a position to which the operator makes a long reach from the closer side of the touch pad 10. The touch pad 10 may be placed at the console box or around it. As illustrated in FIG. 1, the touch pad 10 includes a coordinate detection unit 12, a down movement detection unit 14, a control unit 16, and a memory 18. Also, as illustrated in FIG. 3, the touch pad 10 includes an outer frame member 50, a stopper 52, an elastic member 54, and a substrate 60.

As illustrated FIG. 2, the coordinate detection unit 12 includes an operational surface (touch operational surface) that is two-dimensional and virtually flat. The touch operational surface includes an electrostatic sensor. An output signal of the electrostatic sensor is transmitted to the control unit 16. The coordinate detection unit 12 is configured with, for example, an electrostatic pad. The electrostatic pad has a structure in which, for example, electrodes (electrostatic sensors) extend linearly in the X-direction and the Y-direction, respectively, on a plane having insulators sandwiched. When a finger of a person approaches these electrodes having an insulator panel in-between, capacitors are formed that have the electrodes and the finger as polar plates, and the amounts of electric charge (and their accompanying electrostatic capacitances) change. In this case, detection signals of these electrodes (signals that represent the amounts of change of the electric charge accumulated in the electrodes) may be output to the control unit 16.

The coordinate detection unit 12 is configured to be movable in up and down directions (the Z direction in FIG. 3). An arbitrary mechanism may be adopted to make the coordinate detection unit 12 movable upward and downward. In the example illustrated in FIG. 3, the coordinate detection unit 12 is supported by the substrate 60 via the elastic parts 54, to be movable upward and downward. An up-down stroke of the coordinate detection unit 12 may be set arbitrarily, which may be very short.

The outer frame member 50 is disposed around the circumference of the coordinate detection unit 12. As illustrated in FIG. 3, the outer frame member 50 is disposed in an aspect such that it projects upward with respect to the touch operational surface of the coordinate detection unit 12. Also, the outer frame member 50 is preferably disposed in an aspect such that it projects upward with respect to the surface around the touch pad 10 (for example, the surface of the console box around the touch pad 10 if the touch pad 10 is installed on the console box). The outer frame member 50 may be attached to the coordinate detection unit 12 to be unified with the coordinate detection unit 12. For example, the outer frame member 50 may be combined with the circumference of the coordinate detection unit 12 by interdigitation, may be combined by bonding, or may be combined by using a tightening member such as a screw. Also, the outer frame member 50 may be attached in an aspect such that it is placed on the touch operational surface (namely, may be attached in an aspect such that it covers the circumferential part of the touch operational surface), or may be attached to the circumferential side part (the circumferential side surface) of the touch operational surface in an aspect such that it does not cover the circumferential part of the touch operational surface). Also, the outer frame member 50 may be formed of an arbitrary material, and may be formed of a material different from that of the coordinate detection unit 12. Also, the outer frame member 50 may be formed to be unified with the coordinate detection unit 12. Note that since the coordinate detection unit 12 is formed to be unified with the coordinate detection unit 12, it is configured to be movable in the up and down directions together with the coordinate detection unit 12.

The stopper 52 limits the up-down movement stroke of the outer frame member 50 and the coordinate detection unit 12. In the example illustrated in FIG. 3, the stopper 52 is disposed at a lower part of the outer frame member 50. However, the stopper 52 may be disposed at a lower part of the coordinate detection unit 12. The down movement of the outer frame member 50 and the coordinate detection unit 12 is limited by having the stopper 52 contact the upper surface of the substrate 60. Note that there are a wide variety of stopper mechanisms, and any of the other stopper mechanisms may be used. Also, another stopper mechanism may be added that limits the up movement of the outer frame member 50 and the coordinate detection unit 12. Also, a guiding mechanism may be added that guides the up-down movement of the outer frame member 50 and the coordinate detection unit 12. Also, a mechanism may be added that transfers a sense of a click (or vibration) via the outer frame member 50 and the coordinate detection unit 12 when the outer frame member 50 and the coordinate detection unit 12 are moved downward by a predetermined amount or greater.

The elastic member 54 may be configured with an arbitrary spring such as a flat spring or a coil spring, or may be configured with rubber or a soft resin material. The elastic member 54 springs the coordinate detection unit 12 upward to have the coordinate detection unit 12 maintain a nominal height.

The down movement detection unit 14 outputs a signal that represents a down movement of the outer frame member 50 and the coordinate detection unit 12 of the touch pad 10. The down movement detection unit 14 may be configured with, for example, a tact switch, a pressure-sensitive sensor (for example, a piezo electric device), or the like. The down movement detection unit 14 may be placed at an arbitrary place as long as it is a location that contacts the coordinate detection unit 12 or the outer frame member 50 when the operational surface of the coordinate detection unit 12 moves downward. For example, in the example illustrated in FIG. 3, although a pressure-sensitive sensor that constitutes the down movement detection unit 14 is disposed under a center portion of the coordinate detection unit 12, the pressure-sensitive sensor may be disposed around the circumference of the coordinate detection unit 12 (namely, under the outer frame member 50). Also, pressure-sensitive sensors that constitute the down movement detection unit 14 may be disposed at multiple dispersed locations.

The control unit 16 and the memory 18 are configured with, for example, a microcomputer. The control unit 16 and the memory 18 may be mounted on the substrate 60. Various functions of the control unit 16 (including functions that will be described below) may be arbitrarily implemented by hardware, software, or firmware, or a combination of these. For example, an arbitrary part of or all of the functions of the control unit 16 may be implemented by an ASIC (Application-Specific Integrated Circuit) or an FPGA (Field Programmable Gate Array) for specific usage. Also, the functions of the control unit 16 may be implemented by coordinated multiple computers.

The control unit 16 detects a contact of a finger on the touch operational surface, based on output (an output signal) from the electrostatic sensor of the coordinate detection unit 12. At this moment, the control unit 16 generates a coordinate signal that represents the coordinate position on the touch operational surface, namely, a coordinate signal that represents the coordinate position at which the operator performs a touch operation (the contact position of an operational finger). Note that if the coordinate detection unit 12 is configured with the electrostatic pad, electric charge is accumulated in a capacitor formed by an electrode and an operational finger as described above, and the amounts of change of the electric charge at respective electrodes may be different from each other depending on the positions of the operational fingers. Therefore, it is possible to identify the coordinate positions of the operational fingers, based on the detection signals from the respective electrodes. Specifically, if an output level from the coordinate detection unit 12 exceeds a predetermined reference value (detection threshold), the control unit 16 detects it as a contact of a finger on the touch operational surface, and generates a coordinate signal, based on a placed position of an electrode at which the level of the detection signal is maximum (maximal). The predetermined reference value is a value, for example, that relates to the amount of change of the electric charge accumulated in the electrode. For example, if the amount of change of the electric charge accumulated in the electrode (a maximum amount of change of the electric charge) exceeds the reference value, the control unit 16 determines that the operator performs a selection operation, and generates a coordinate signal (for example, a coordinate signal that represents a two-dimensional position at which the amount of change of the electric charge is maximum); or if the amount of change of the electric charge accumulated in the electrode does not exceed the reference value, the control unit 16 determines that no finger contacts the touch operational surface, and does not generate a coordinate signal. Note that the reference value may be stored in the memory 18. The generated coordinate signal is transmitted to the display control unit 30.

The control unit 16 generates a determination signal, based on an output signal from the down movement detection unit 14. For example, if the down movement detection unit 14 is formed with a pressure-sensitive sensor, when output from the pressure-sensitive sensor (press pressure) exceeds a predetermined threshold Pn, the control unit 16 detects it as a determination operation by the operator, to generate a determination signal. If the down movement detection unit 14 is formed with a tact switch, and an on signal is input from the tact switch, the control unit 16 detects it as a determination operation by the operator, to generate a determination signal. The generated determination signal is output to the display control unit 30. Note that if multiple pressure-sensitive sensors that constitute the down movement detection unit 14 are disposed, the control unit 16 may generate a determination signal when output from any one of the pressure-sensitive sensors exceeds the predetermined threshold Pn. In this case, the multiple pressure-sensitive sensors may not be disposed for detecting a press position on the touch pad 10 (typically, the electrostatic pad that constitutes the coordinate detection unit 12), but may be disposed just for detecting whether a press operation is performed on the touch pad 10. Therefore, the determination signal is a signal just representing that a determination operation is detected, and may be a signal that does not include other information such as information about the position of a press operation (including information that represents which one of the outer frame member 50 and the coordinate detection unit 12 is pressed). Similarly, if multiple tact switches that constitute the down movement detection unit 14 are disposed, the control unit 16 may generate a determination signal when an on signal is input from any one of the tact switches. The generated determination signal is output to the display control unit 30.

Note that since the outer frame member 50 is disposed as described above in the present embodiment, there are cases where the touch pad 10 transmits a determination signal that is accompanied by transmission of a coordinate signal, and cases where the touch pad 10 transmits just a determination signal that is not accompanied by transmission of a coordinate signal. Namely, if the operator presses down the touch pad 10 by a finger, and moves the touch pad 10 downward, a determination signal and a coordinate signal are generated. On the other hand, if the operator presses down only the outer frame member 50 by a finger, without contacting the touch pad 10 (namely, without exceeding the detection threshold of a contact of a finger), and moves the outer frame member 50 downward, a coordinate signal is not generated, but only a determination signal is generated.

The control unit 16 communicates with the display control unit 30 to transmit various information (a coordinate signal, a determination signal, a message output request, etc.) to the display control unit 30. Note that a part of or all of the functions of the control unit 16 may be implemented by the coordinate detection unit 12.

The display 20 is disposed at a remote position with respect to the touch pad 10. The display 20 may be an arbitrary display unit such as an LCD display or an HUD (head-up display). The display 20 is disposed at an appropriate position in the vehicle compartment (for example, on an instrument panel). The display 20 may be a touch panel display, or may be a display on which a touch operation cannot be performed. An operational screen is shown on the display 20 (see FIG. 4) that represents operational contents that can be operated on the touch pad 10. Note that the display 20 may display a TV program, images of a peripheral monitor camera, or the like on the background of the operational screen, or when not showing an operational screen.

As illustrated in FIG. 4, an operational screen may be shown on the entire screen, or may be shown on a part of the screen. As illustrated in FIG. 4, an operational screen may include two or more selection items that can be operated on the touch pad 10. An operational screen may include parts that show other information (for example, a TV program, audio, outdoor atmospheric temperature, travel information such as fuel efficiency, and a part to show entertainment information). Note that, in the example illustrated in FIG. 4, the operational screen is for various operations of a radio on the touch pad 10.

A selection item constitutes a virtual operational button, which means that it is not a mechanical button that is directly operated by a hand. A selection item (an operational button) may be of an arbitrary type (function). Namely, operational contents that can be operated on the touch pad 10 can be set arbitrarily. For example, the selection items may include a selection item to show (call) a screen for various settings of a navigation device (an operational screen), or a map screen (for example, a current position display screen) on the display 20. Also, the selection items may include a selection item for various settings of an air conditioner, a selection item to show the setting screen on the display 20, and the like. Also, the selection items may include a selection item for various settings of an audio device or a TV (such as volume adjustment), a selection item to show the setting screen on the display 20, and the like. Also, the selection items may include a selection item to activate an arbitrary application (an icon or a launcher). Also, a selection item may be a character input button on an operational screen on which letters can be input. Also, a selection item may include lists that can be scrolled in the respective list screens. Also, a selection item may include buttons to scroll the respective lists.

Under control of the display control unit 30 as will be described later, displaying a selection item is changed from usual displaying to selection displaying, or from selection displaying to usual displaying, based on a coordinate signal from the touch pad 10. In the example illustrated in FIG. 4, a cursor 80 is shown on the display 20 that can be moved by an operation on the touch pad 10. For example, the cursor 80 is in a state where it is positioned on a selection item "SAT" that relates to a satellite broadcast. Therefore, the selection item "SAT" is shown by the selection displaying. Note that the cursor 80 here represents a selection item itself that is shown by the selection displaying. Therefore, the position of the cursor 80 corresponds to the position of the selection item shown by the selection displaying.

Similarly to the control unit 16, the display control unit 30 may be configured with, for example, a microcomputer, and may be embodied as an ECU. Note that the display control unit 30 may be connected with the touch pad 10 in an arbitrary way, which may be a wired connection, a wireless connection, or a combination of these, and may be a direct connection or an indirect connection. Also, a part of or all of the functions of the control unit 16 may be implemented by the control unit 16 of the touch pad 10, or a control unit (not shown) in the display 20. Conversely, a part of or all of the functions of the control unit 16 of the touch pad 10 may be implemented by the display control unit 30.

If necessary, the display control unit 30 may receive, as input, vehicle speed information that represents the vehicle speed, and power source information that relates to a state (IG and ACC) of the power source of the vehicle.

The display control unit 30 is connected with a controller 40. The controller 40 controls a device that is operated via the operation device for the vehicle 1. For example, the controller(s) 40 may include an audio controller to control an audio device, a navigation controller to control a navigation device, a controller to control an air conditioner, and the like. Note that the display control unit 30 may implement a part of or all of the functions of the controller(s) 40.

The display control unit 30 assists an operation on the touch pad 10 by synchronizing the display 20 with the touch pad 10. Specifically, the display control unit 30 shows an operational screen on the display 20 (see FIG. 4), and based on a signal (a coordinate signal or a determination signal) from the touch pad 10, executes a selection/determination process, for the various selection items. Namely, as described above, the display control unit 30 shows one of the selection items on the operational screen by the selection displaying, based on a coordinate signal from the touch pad 10 (namely, responds to a "selection operation"). Namely, the display control unit 30 determines the position of the cursor 80. At this moment, the display control unit 30 may operate in an absolute coordinate mode. The absolute coordinate mode is a mode in which the coordinate system of the screen of the display 20 synchronizes with the coordinate system of the operational surface of the touch pad 10, in an aspect of absolute synchronization. In the absolute coordinate mode, the coordinate system of the screen of the display 20 is associated with the coordinate system of the operational surface of the touch pad 10, in an aspect where the origin of the coordinate system on the display 20 is typically positioned at a fixed position, and the origin of the coordinate system of the operational surface of the touch pad is positioned at a fixed position. In the example illustrated in FIG. 5, the coordinate system of the screen of the display 20, which has its origin fixedly positioned at the lower left corner of the screen of the display 20, is associated with the coordinate system of the operational surface of the touch pad 10, which has its origin fixedly positioned at the lower left corner of the operational surface of the touch pad 10. Note that the size of the screen of the display 20 is not equivalent to the size of the operational surface of the touch pad 10 in general. Therefore, the correspondence relationship between the coordinate systems may be a proportionate relationship depending on the ratio of these sizes.

Note that, in an initial state of an operational screen, an arbitrary one of the selection items may be shown by the selection displaying as a default, or every selection item may be shown by the non-selection displaying. Note that the selection displaying (namely, an aspect of the cursor 80) may be shown in an arbitrary way as long as the operator can recognize that the selection item is selected. For example, it may be realized by differentiating the brightness or the color of the selection item shown by the selection displaying, with that of the other selection items, or by highlighting the outer frame of the selection item.

In response to a coordinate signal from the touch pad 10, the display control unit 30 shows an arbitrary one of the selection items by the selection displaying (namely, displays the cursor 80). After that, the display control unit 30 may maintain the selected state of the selection item even if the coordinate signal from the touch pad 10 stops coming. This is because there is a likelihood that the operation may be continued again after the finger has been detached from the touch pad 10. At this moment, the selected state of the selection item may be maintained until another selection item is selected depending on a coordinate signal from the touch pad 10 (or until switched to another operational screen, or until the operational screen is turned off). Alternatively, the selected state of the selection item may be maintained for a comparatively long predetermined time after the coordinate signal from the touch pad 10 has stopped coming.

Also, based on a determination signal from the touch pad 10, the display control unit 30 implements the operational contents of a selection item that is shown by the selection displaying at that moment (namely, responds to a "determination operation"). Note that the operational contents depend on a selection item relating to the determination operation, and may include displaying lower level selection items; transitioning to a screen, such as changing an operational screen; inputting characters; activating an application; transmitting a control signal to the controller 40; and the like. Also, when detecting a determination operation, to indicate to the user that a "determination operation" is detected, the display control unit 30 may appropriately change the displaying of the determined selection item, or may generate predetermined sound.

According to the touch pad 10 in the present embodiment, the operator can perform a selection operation by having an operational finger (for example, the index finger) contact on the operational surface of the coordinate detection unit 12, and by moving the operational finger on the operational surface while watching the display 20, to select a desired selection item. Then, when the desired selection item is shown by the selection displaying, by pressing the coordinate detection unit 12 at the place by the operational finger, the operator can perform a determination operation. Namely, by pressing the coordinate detection unit 12 at the contact position where the desired selection is performed, the operator can continuously perform the selection operation and the determination operation. Thus, a mechanical switch for a determination operation does not need to be disposed separately, and the space-saving can be achieved.

Also, even if the operator detaches the operational finger from the coordinate detection unit 12 after the selection operation and before the determination operation, the operator can perform the determination operation of the currently selected selection item by pressing the outer frame member 50 of the touch pad 10 downward. This effect is especially useful when using the touch pad 10 in a vehicle. This is because if the operator is the driver in the vehicle, he/she needs to detach the operational finger from the touch operational surface during an operation. For example, a case may be considered where the driver is the operator, and he/she operates the touch operational surface while stopping the vehicle, and then, the traffic light turns green, and he/she has the vehicle restart traveling. In such a case, to continue the operation after the restart, he/she can have the finger contact the touch operational surface. However, it is highly likely that a touch position at this moment is shifted from a position on the touch operational surface that corresponds to an operational item that is currently selected. In the absolute coordinate mode, depending on the touch position at this moment, the selection item to be selected may change (namely, the cursor 80 moves), and the operator may need to select the desired selection item again. In this regard, since the outer frame member 50 is disposed on the circumference around the touch operational surface, it can be easily operated without contacting the touch operational surface (namely, without exceeding the detection threshold of a contact of a finger). In this way, by providing the outer frame member 50, the operator can easily perform the determination operation for the currently selected selection item even if he/she has had the hand move away from the coordinate detection unit 12.

Figure 6:
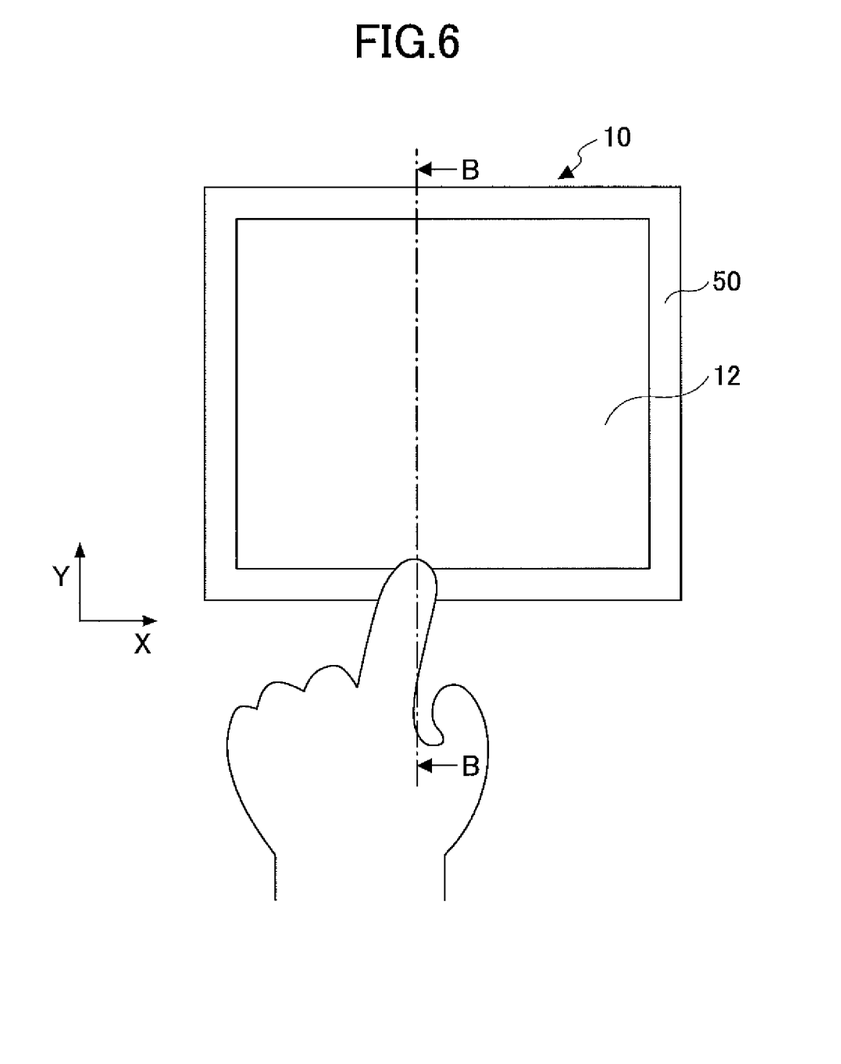
FIG. 6 is a top view that basically illustrates an example of a state of a hand that operates an outer frame member 50 of the touch pad 10.
Figure 7:
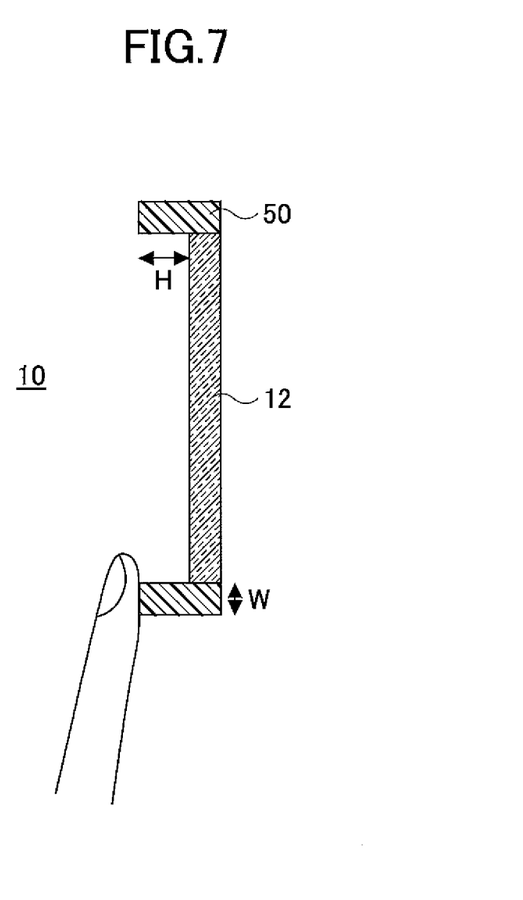
FIG. 7 is a cross-sectional view taken along a line B-B in FIG. 6.

FIG. 6 is a top view that basically illustrates an example of a state of a hand that operates the outer frame member 50 of the touch pad 10, and FIG. 7 is a cross-sectional view taken along a line B-B in FIG. 6. Note that only the outer frame member 50 and the coordinate detection unit 12 are illustrated for the touch pad 10 in FIG. 7.

The outer frame member 50 preferably has the width W and the height H with which the operator can perform an operation easily without contacting the touch operational surface of the coordinate detection unit 12. Note that the height H of the outer frame member 50 is a height from the touch operational surface of the coordinate detection unit 12. The width W of the outer frame member 50 may be set to a minimum necessary value because it influences the entire size of the touch pad 10. For example, the width W of the outer frame member 50 may be about 5 mm to 10 mm. However, the width W of the outer frame member 50 can be set less if the height H of the outer frame member 50 is higher. This is because the higher the height H of the outer frame member 50 is, the higher the operability of a press operation of the outer frame member 50 is (namely, the operability when performing a press operation on the outer frame member 50 without contacting the touch operational surface). On the other hand, if the height H is higher, the touch operability is worse on the circumferential part (the region inside of the outer frame member 50) of the touch operational surface of the coordinate detection unit 12. Furthermore, since the outer frame member 50 constitutes the design, it may be restricted from the design point of view. Therefore, the width W and the height H of the outer frame member 50 may be set appropriately with taking these factors into consideration.

Figure 8:
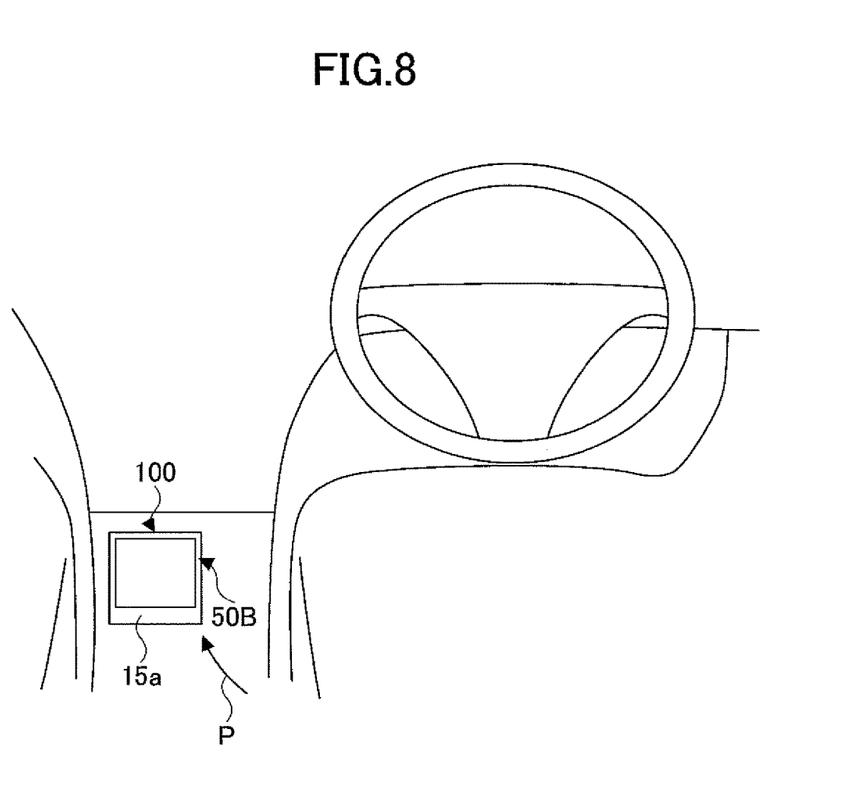
FIG. 8 is a diagram that illustrates an example of a state where a touch pad 100 is installed in a vehicle according to another example.
Figure 9:
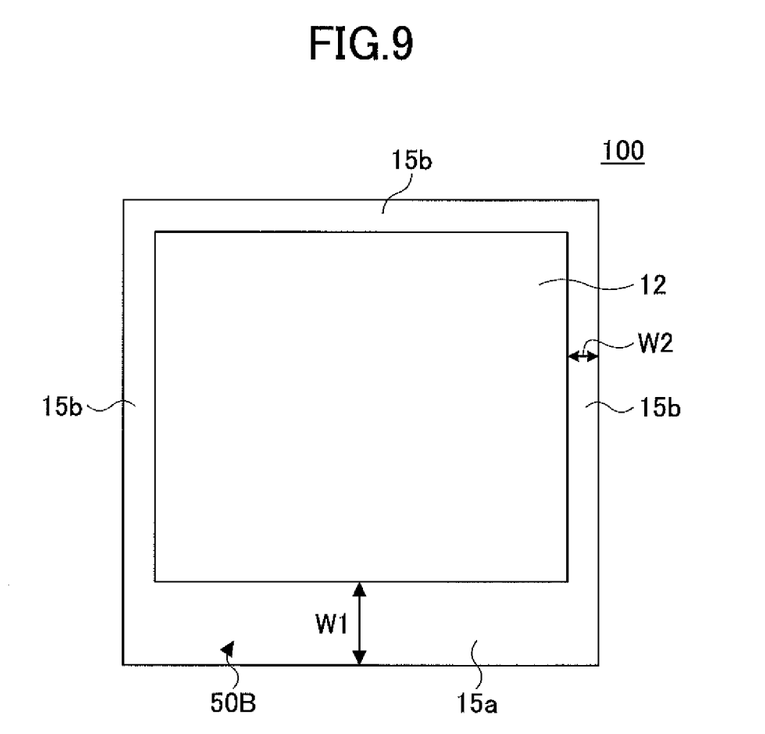
FIG. 9 is a top view that basically illustrates the touch pad 100 illustrated in FIG. 8.

FIG. 8 is a diagram that illustrates an example of a state where a touch pad 100 is installed in a vehicle according to another example, and FIG. 9 is a top view that basically illustrates the touch pad 100 illustrated in FIG. 8.

The touch pad 100 illustrated in FIG. 8 is disposed around the console box. In this case, the driver (the operator) makes a long reach from the closer side of the touch pad 100, to operate the touch pad 100. Note that a direction to make a long reach for operating the touch pad 100 (operational direction) is designated by an arrow P in FIG. 8.

The touch pad 100 differs from the touch pad 10 in the example described above in that an outer frame member 50B is included instead of the outer frame member 50. The other elements may be the same.

As illustrated in FIG. 9, the outer frame member 50B has the circumference (four sides) of the touch operational surface include a first part 15*a* disposed as a circumferential part on the closer side, and a second part 15*b* disposed on the other sides (three sides). Note that the four sides correspond to the closer side, the further side, the left side, and the right side. The first part 15*a* and the second part 15*b* may be integrally formed, or may be separately formed to be integrated afterward. Considering the operational direction (see the arrow P in FIG. 8) to reach the outer frame member 50B, the first part 15*a* corresponds to a part that is the easiest for an operator to operate the outer frame member 50B. Therefore, the width W1 of the first part 15*a* is set greater than the width W2 of the second part 15*b*. Thus, only the width W1 of the first part 15*a* needs to be set to an appropriate width from the viewpoint of making the operability higher for a press operation on the outer frame member 50B as described above (the operability when operating the outer frame member 50B without contacting the touch operational surface). Namely, while the operability can be made higher for a press operation on the outer frame member 50B, the width W2 of the second part 15*b* is kept to minimum necessary, and hence, the space-saving can be achieved.

Note that, in the example illustrated in FIG. 8 and FIG. 9, the first part 15*a* may be configured to have the width W1 uniformly, or to have the width W1 partially.

Also, in the example illustrated in FIG. 8 and FIG. 9, the height of the first part 15*a* may be the same as the height of the second part 15*b*, or may set greater than the height of the second part 15*b*.

Also, in the example illustrated in FIG. 8 and FIG. 9, the down movement detection unit 14 may be disposed under the first part 15*a* to make the detection sensitivity higher for a down movement of the outer frame member 50B.

Also, in the example illustrated in FIG. 8 and FIG. 9, although the touch pad 100 is placed around the console box, the touch pad 100 may be placed at an arbitrary position in the vehicle compartment as long as it is a position at which the touch pad 100 can be operated by the operator on the closer side (the rear side of the vehicle).

Also, in the example illustrated in FIG. 8 and FIG. 9, although the first part 15a of the outer frame member 50B forms the part on the closer side of the outer frame member 50B since the touch pad 100 is operated by the operator on the closer side (the rear side of the vehicle), the position of the first part 15a in the outer frame member 50B may be changed depending on an operational direction in which the operator operates the touch pad 100. For example, if it is planned that the touch pad 100 is operated by the operator on the right side, by making a long reach in a lateral direction, the first part 15a may be placed as the right side circumferential part in the circumference (four sides) of the touch operational surface (namely, the first part 15a may constitute the right side part of the outer frame member 50B).

Also, in the example illustrated in FIG. 8 and FIG. 9, although the first part 15a corresponds to a part among the parts on the four sides of the outer frame member 50B (the other three parts constitute the second part 15b), the first part 15a may constitute two or three parts among the parts on the four sides of the outer frame member 50B.

Also, in the example illustrated in FIG. 8 and FIG. 9, the outer frame member 50B is rectangular, which corresponds to the rectangular circumferential shape of the touch operational surface of the touch pad 100, and the parts on the four sides of the outer frame member 50B correspond to the four sides of the rectangle of the touch operational surface. However, the outer frame member 50B may have another shape. For example, the outer frame member 50B may have a rectangular shape for its inner circumferential side to correspond to the rectangle of the touch operational surface, may have an oval shape for its outer circumferential side.

Figure 10:
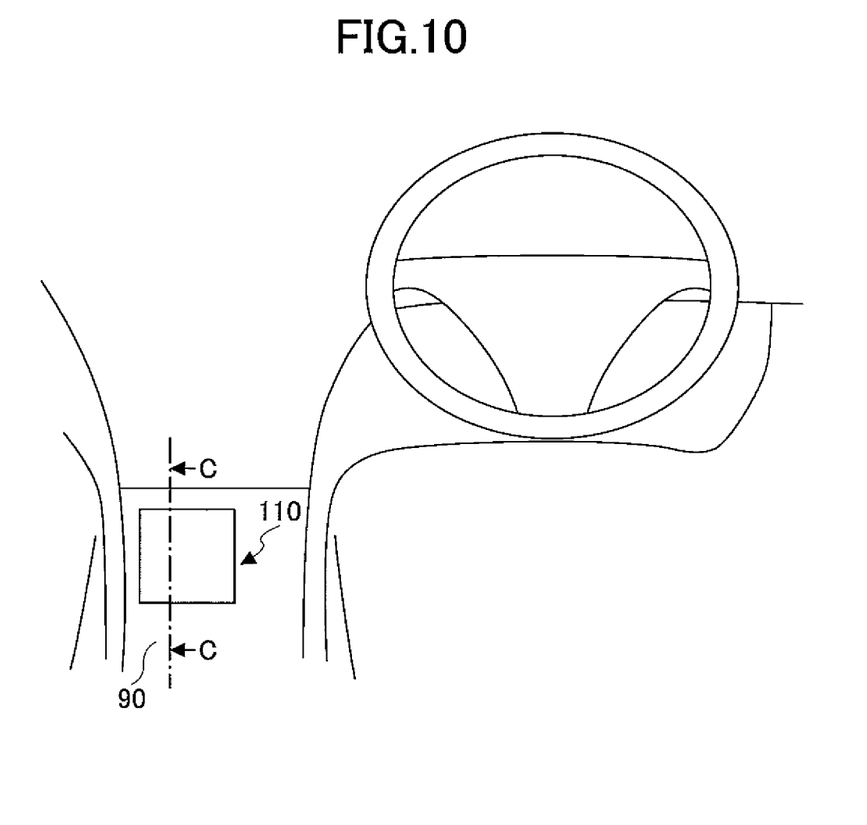
FIG. 10 is a diagram that illustrates an example of a state where a touch pad 110 is installed in a vehicle according to another example.
Figure 11:
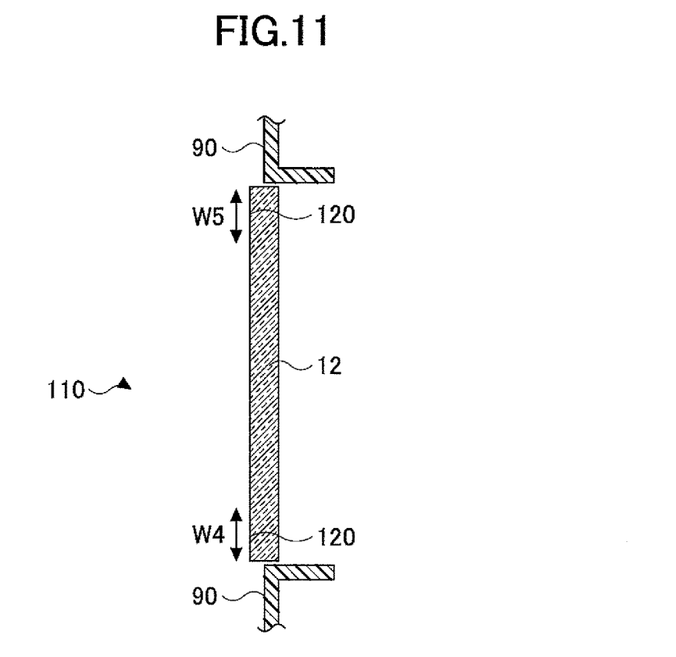
FIG. 11 is a cross-sectional view that basically illustrates a cross section taken along a line C-C in FIG. 10.

FIG. 10 is a diagram that illustrates an example of a state where a touch pad 110 is installed in a vehicle according to another example, and FIG. 11 is a cross-sectional view that basically illustrates a cross section taken along a line C-C in FIG. 10. Note that only the coordinate detection unit 12 (touch operational surface) is illustrated for the touch pad 110 in FIG. 11.

Although the touch pad 110 is placed around the console box, the touch pad 110 may be placed at an arbitrary position. The touch pad 110 principally differs from the touch pads 10 and 100 in the examples described above in that an outer frame member 50 or 50B is not provided. Instead of that, the touch pad 110 is set to have a non-sensitive band region 120 on a circumferential part of the coordinate detection unit 12 (touch operational surface) as illustrated in FIG. 11. The non-sensitive band region 120 is a region on which the output signal of the electrostatic sensor is not generated, or generated but invalidated even if the region is contacted by a finger. For example, the non-sensitive band region 120 may be implemented by not providing an electrode in the region.

The width W4 of the non-sensitive band region 120 on the closer side of the touch operational surface may be the same as the width W5 of the non-sensitive band region 120 on the other three sides. Alternatively, based on the same notion as in the example illustrated in FIG. 8 and FIG. 9, the width W4 of the non-sensitive band region 120 on the closer side of the touch operational surface may be greater than the width W5 of the non-sensitive band region 120 on the other three sides.

Moreover, the non-sensitive band region 120 may be set only on the circumferential part on the closer side of the touch operational surface.

The touch operational surface of the coordinate detection unit 12 is preferably set higher than the surface around the touch pad 110. For example, in the example illustrated in FIG. 11, the touch operational surface of the coordinate detection unit 12 is set higher than the surface around the touch pad 110 on the console box 90. Thus, the operability of a press operation, which is realized by contacting only the non-sensitive band region 120 of the touch pad 110, can be raised. Note that the touch operational surface of the coordinate detection unit 12 may be leveled at the same height as the surface around the touch pad 110, or may be leveled lower than the surface around the touch pad 110.

Figure 12:
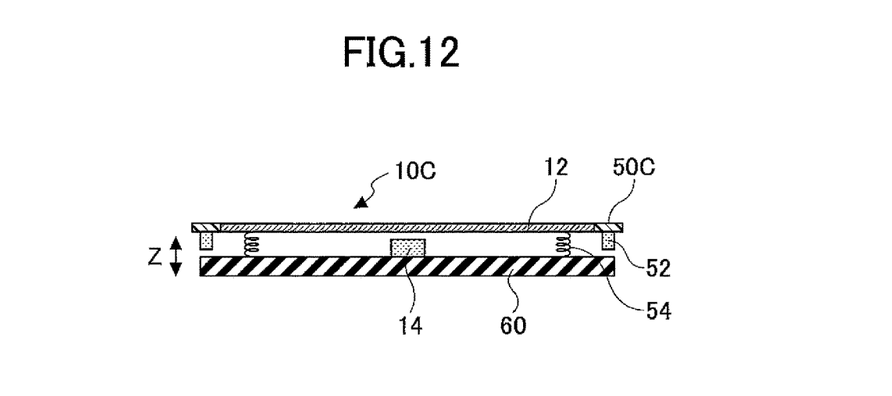
FIG. 12 is a cross-sectional view that basically illustrates a cross section of a core part of a touch pad 10C according to another example.

FIG. 12 is a cross-sectional view that basically illustrates a cross section of a core part of a touch pad 10C according to another example. In the example illustrated in FIG. 12, an outer frame member 50C extends at the same height as the height of the touch operational surface of the coordinate detection unit 12. Namely, the outer frame member 50C extends on the same plane as the touch operational surface of the coordinate detection unit 12. Configured in this way, substantially the same effect can be obtained as with the touch pad 10 in the embodiment described above although the operability is lower for a press operation on the outer frame member 50C (the operability to operate the outer frame member 50C without contacting the touch operational surface) compared to the touch pad 10 in the embodiment described above. On the other hand, configured in this way, the design may be better because the unity of the outer frame member 50C and the touch operational surface of the coordinate detection unit 12 may be raised, compared to the touch pad 10 in the embodiment described above.

The embodiments have been described in detail. Further, the present invention is not limited to these embodiments, but various variations and modifications may be made without departing from the scope of the present invention. Also, all or multiple elements in the above embodiments may be combined.

For example, in the embodiments described above, the touch operational surface of the coordinate detection unit 12 of the touch pad 10 (the same for the touch pad 100, and the same in the following) may be set to have, on a circumferential part inside of the outer frame member 50, a non-sensitive band region on which the output signal of the electrostatic sensor is not generated or generated but invalidated even if the region is contacted by a finger. Namely, the touch pad 10 may be implemented by being combined with the examples illustrated in FIG. 10 and FIG. 11.

Also, in the embodiments described above, the outer frame member 50 of the touch pad 10 (the same for the outer frame member 50B of the touch pad 100, and the outer frame member 50C of the touch pad 10C, and the same in the following) may be formed in a different color from the color of the touch operational surface of the touch pad 10 from the viewpoint of making the operability higher for a press operation on the outer frame member 50. Also, the outer frame member 50 of the touch pad 10 may be configured to emit light or the like. This makes it easier for an operator to grasp an approximate position of the outer frame member 50 at a glance, and easier to operate the outer frame member 50 without contacting the touch operational surface.

Also, in the embodiments described above, although an electrostatic sensor is used for the detection mechanism of a touch operation on the touch pad 10, a touch operation may be detected based on another principle (sensor). For example, the touch pad 10 may be configured with a touch panel having a subtle pressure sensitivity.

Also, in the embodiments described above, although the position of cursor 80 is determined in the absolute coordinate mode, the position of cursor 80 is determined in a relative coordinate mode. Note that a relative coordinate mode is a mode in which the coordinate system of the screen of the display 20 synchronizes with the coordinate system of the operational surface of the touch pad 10, in an aspect of relative synchronization. In such a relative coordinate mode, the coordinate system of the screen of the display 20 is associated with the coordinate system of the operational surface of the touch pad 10, in an aspect where the origin of the coordinate system on the display 20 is typically positioned at a current position of the cursor 80, and the origin of the coordinate system of the operational surface of the touch pad 10 is positioned at a contact position of an operational finger on a current operational surface.

Also, in the embodiments described above, although the position of cursor 80 is determined in the absolute coordinate mode, the absolute coordinate mode and a relative coordinate mode may be switched appropriately. For example, if one of the selection items on an operational screen of the display 20 is selected (namely, it is in a selected state), it may be set to the relative coordinate mode, or if none of the selection items on the operational screen of the display 20 is selected (namely, the cursor 80 is not displayed), it may be set to the absolute coordinate mode.

Also, in the embodiments described above, although it is configured to have the cursor 80 indicate a relationship between a contact position of a finger of a user on the touch operational surface of the touch pad 10, and a position on an operational screen of the display 20, a pointer, which is used on a usual PC (Personal Computer) or the like, may be used. When using a pointer, the cursor 80 (the selection displaying) may be maintained.

DESCRIPTION OF REFERENCE SYMBOLS

1 operation device for a vehicle
10,10C,100 touch pad
12 coordinates detection unit
14 down movement detection unit
15a first part
15b second part
16 control unit
18 memory
20 display
30 display control unit
40 controller
50,50B,50C outer frame member
52 stopper
54 elastic part
60 substrate
80 cursor

The invention claimed is:

1. An operation device for a vehicle, comprising:
a touch operational surface configured to be movable upward and downward relative to a substrate on which the touch operational surface is supported, and to include a first sensor to output a first signal representing a contact of a finger;
an outer frame member configured to be disposed around a circumference of the touch operational surface, in an aspect such that the outer frame member projects upward compared to the touch operational surface, or in an aspect such that the outer frame member extends on the same plane as the touch operational surface, and to be movable upward and downward relative to the substrate together with the touch operational surface as a whole;
a second sensor to output a second signal representing a downward movement of the outer frame member relative to the substrate; and
an electronic control unit (ECU) configured to respond, based on the first signal output by the first sensor, to a selection operation performed on selection items shown on a display unit being remotely placed with respect to the touch operational surface, and to respond, based on the second signal output by the second sensor, to a determination operation performed on the selection item having been selected.

2. The operation device for the vehicle, as claimed in claim 1, wherein after one of the selection items has been selected by the selection operation, when the contact of the finger on the touch operational surface is not detected, the ECU maintains a selected state of the selected selection item for a predetermined time.

3. The operation device for the vehicle, as claimed in claim 1, wherein the outer frame member includes a first part disposed at a circumferential part on a predetermined side of the touch operational surface, and a second part at a circumferential part on other sides,
wherein at least one of a width and a height of the first part is greater than that of the second part.

4. The operation device for the vehicle, as claimed in claim 1, wherein the ECU operates in an absolute coordinate mode in which a coordinate system of the touch operational surface absolutely corresponds to a coordinate system of the display unit.

5. An operation device for a vehicle, comprising:
a touch operational surface configured to be movable upward and downward relative to a substrate on which the touch operational surface is supported, and to include a first sensor to output a first signal representing a contact of a finger;
a second sensor configured to output a second signal representing a downward movement of a non-sensitive band region, on which the first signal of the first sensor is not output even when contacted by the finger, that is set on a circumferential part of the touch operational surface, relative to the substrate; and
an electronic control unit (ECU) configured to respond, based on the first signal output by the first sensor, to a selection operation performed on selection items shown on a display unit being remotely placed with respect to the touch operational surface, and to respond, based on the second signal output by the second sensor, to a determination operation performed on the selection item having been selected.

6. The operation device for the vehicle, as claimed in claim 5, wherein the non-sensitive band region is disposed on a predetermined side of the circumferential part of the touch operational surface, and on other sides of the circumferential part of the touch operational surface,
wherein a width of the non-sensitive band region disposed on the predetermined side of the circumferential part of the touch operational surface is greater than a width of the other sides of the circumferential part of the touch operational surface.

7. The operation device for the vehicle, as claimed in claim 1, wherein the second sensor is configured to output the second signal based on a downward movement of any and every side of the outer frame member relative to the substrate.

8. The operation device for the vehicle, as claimed in claim 5, wherein the second sensor is configured to output the second signal based on a downward movement of any and every side of the touch operational surface relative to the substrate.

* * * * *